(12) United States Patent
Lee (10) Patent No.: US 8,072,716 B2
(45) Date of Patent: Dec. 6, 2011

(54) AFCI DEVICE

(75) Inventor: Jun Bae Lee, Seoul (KR)

(73) Assignee: Hetko, Inc., Seoul (KR)

( * ) Notice: Subject to any disclaimer, the term of this patent is extended or adjusted under 35 U.S.C. 154(b) by 401 days.

(21) Appl. No.: 12/257,592

(22) Filed: Oct. 24, 2008

(65) Prior Publication Data

US 2010/0103568 A1    Apr. 29, 2010

(51) Int. Cl.
*H02H 9/08* (2006.01)
*H02H 3/00* (2006.01)

(52) U.S. Cl. ............................. 361/42; 361/2
(58) Field of Classification Search ............ 361/42, 361/2
See application file for complete search history.

(56) References Cited

U.S. PATENT DOCUMENTS

| | | | |
|---|---|---|---|
| 6,191,589 B1 * | 2/2001 | Clunn | 324/424 |
| 6,198,611 B1 * | 3/2001 | Macbeth | 361/42 |
| 7,538,993 B2 * | 5/2009 | Huang et al. | 361/42 |
| 2007/0025032 A1 * | 2/2007 | Bradley et al. | 361/42 |

* cited by examiner

*Primary Examiner* — Jared Fureman
*Assistant Examiner* — Lucy Thomas
(74) *Attorney, Agent, or Firm* — Berenato & White, LLC (57) ABSTRACT

An arc fault circuit interrupter (AFCI) device prevents malfunction of an electric circuit and checks the state of the circuit and connection state of lines. One of a phase conductor line and a neutral conductor line is wound around a transformer which converts a current difference flowing in the AC line into voltage to detect whether an arc fault occurs, and a voltage induced by the wound line is rectified into direct-current and is converted into constant voltage to obtain power for the AFCI. An arc wave generator includes a rectifier to generate a rectified signal; a drop resistor which drops the voltage of the rectified signal to generate a voltage-dropped signal; and a mono-stable multivibrator which adjusts a voltage level and a pulse width of the voltage-dropped signal and generates a pulse signal that is used to generate a false arc for testing the AFCI.

10 Claims, 7 Drawing Sheets

AFCI DEVICE

FIELD OF THE INVENTION

The present invention relates to an arc fault circuit interrupter (AFCI) device which can detect an electric arc fault of an electric circuit, and more particularly, an arc fault circuit interrupter (AFCI) device which can prevent the malfunction of an electric circuit due to invalid arc, and check whether a circuit operation is normally performed, together with a connection state of lines.

BACKGROUND OF THE INVENTION

Usually, a molded-case circuit breaker (MCCB) and an earth leakage circuit breaker are used in homes for prevention of fire or electric shock accidents. The molded-case circuit breaker (MCCB) is used for the purpose of protecting electric wires, and the earth leakage circuit breaker is used for the purpose of protecting a user by sensing an electric leakage on an electric circuit and shutting off electric power when the user gets shocked in the midst of using electric appliances.

Although molded-case circuit breaker (MCCB) and earth leakage circuit breakers have been widely installed in the world, a lot of fires break out every year worldwide. This is because arcing type fault occurs. Fox example, arcing type fault may occur due to aging of electric systems, insulation breakdown and wiring destruction, mechanical and electrical stress due to overuse or over-current, connection defect, or excessive mechanical damage to insulation and wiring in very various forms. This arcing type fault is low-current and high-impedance, and generates electric current that has an average RMS (Root Mean Square) value fewer than a thermal threshold of a circuit-breaker. Accordingly, the circuit breaker which is used as a cable cutting or interruption device does not react with a defective situation, and accordingly, fire may break out frequently.

Thus, an arc fault circuit interrupt (AFCI) device that can intercept electric arc fault is required compulsorily. Since 2002 in the U.S.A., an arc fault circuit interrupter (AFCI) has been required under many building codes.

As stated above, the conventional AFCI device has detected an amount of variation of the current that flows on a phase conductor line and a neutral conductor line to which alternating-current (AC) power source is supplied by a current transformer (CT), and judged whether the arc fault of an electric circuit occurs. When the arc fault of the electric circuit is generated, the electric power of the electric circuit is shut off.

However, since the conventional AFCI device is supplied with a direct power source from an AC line, there frequently occurs malfunction due to up-stream according to the input of an electric arc signal generated around the AC line. Also, an abnormal trip by lightening surges that flow in the AC line is generated to thereby cause the malfunction of the electric circuit.

SUMMARY OF THE INVENTION

To solve the above problems of conventional, it is an object of the present invention to provide an arc fault circuit interrupter (AFCI) device which can detect an electric arc fault of an electric circuit and prevent the malfunction of the electric circuit due to invalid arc, in which the drive power for a circuit of the AFCI device is applied from a current transformer (CT), instead of an AC line.

It is another object of the present invention to provide an AFCI device which can generate a false arc waveform that is similar to an arc waveform generating an actual arc fault, and exactly test the operation of the AFCI device, to thereby check whether an operation of the AFCI device is normally performed.

It is yet another object of the present invention to provide an AFCI device which can check a connection state of lines visually, by displaying whether a power source is applied to the device or not.

In order to achieve the above objects of the present invention, there is provided an AFCI device Which detects an electric arc fault from an alternating-current (AC) power, the AFCI device comprising:

a current transformer (CT), wound around one side of which a conductor line through which the alternating-current (AC) power is supplied by a certain number of times; a power circuit which rectifies an alternating-current (AC) voltage signal induced from the conductor that is wound around one side of the current transformer (CT), and converts the rectified result into a constant voltage signal to then be supplied as drive power necessary for an arc fault detector; an arc fault detector, supplied with the drive power from the power circuit, which detects an arc fault from a voltage signal according to an amount of current variation of the current transformer; a power breaker which shuts off the power source when an interrupt signal is applied from the arc fault detector; a display which displays the supply of the power source to ascertain whether lines are connected; and a false arc generator which produces a pulse signal of a waveform that generates a false arc, supplies the generated pulse signal to the arc fault detector, and tests whether a circuit operation is normally operated.

BRIEF DESCRIPTION OF DRAWINGS

The above and other objects and advantages of the present invention will become more apparent by describing the embodiments thereof in more detail with reference to the accompanying drawings in which.

DETAILED DESCRIPTION OF THE INVENTION

Hereinafter, an arc fault circuit interrupter (AFCI) device according to embodiments of the present invention will be described with reference to the accompanying drawings. In the description, like reference numerals denote like elements.

Figure 1:
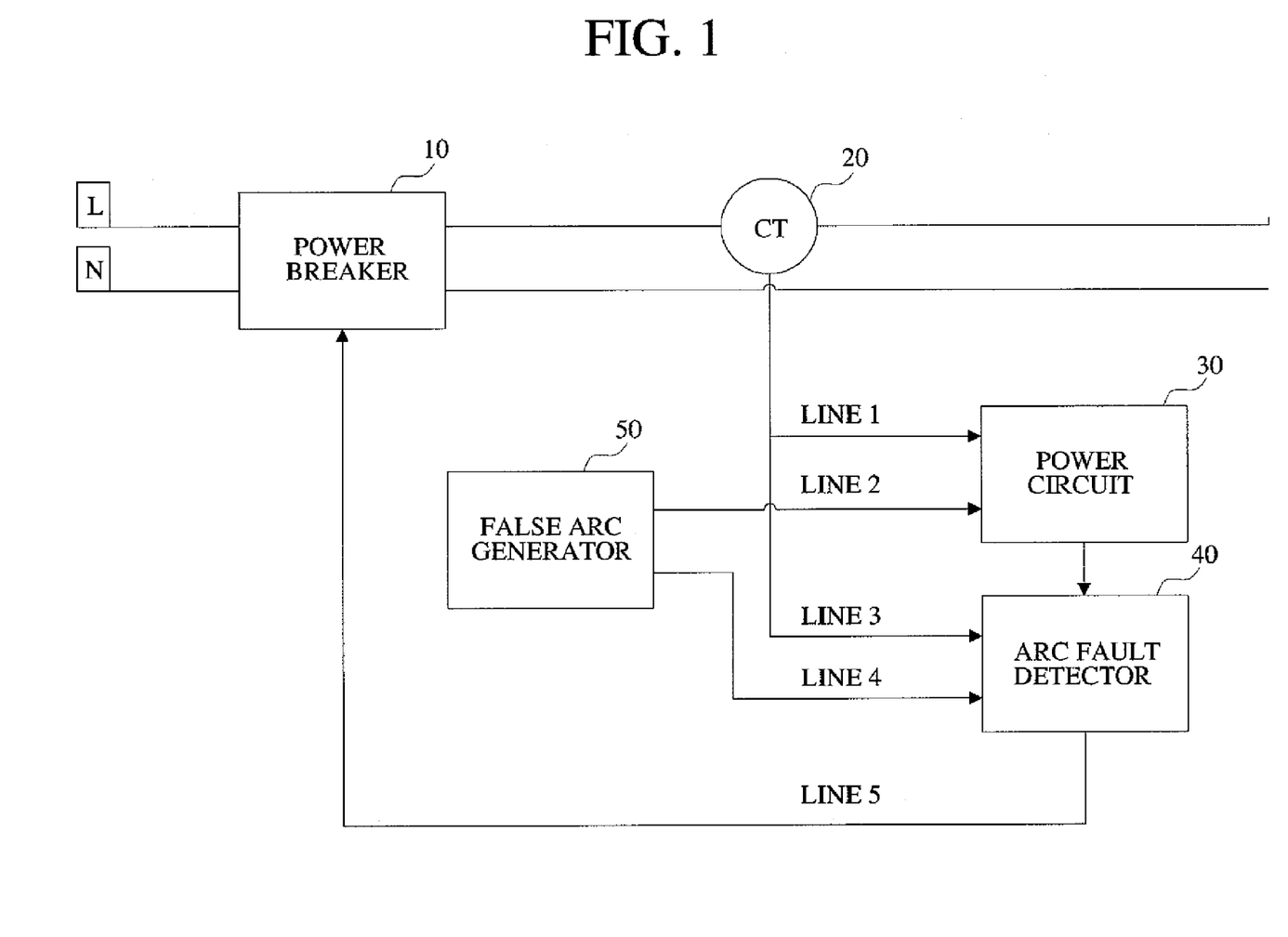
FIG. 1 is a block diagram showing an AFCI device according to the present invention.
Figure 2:
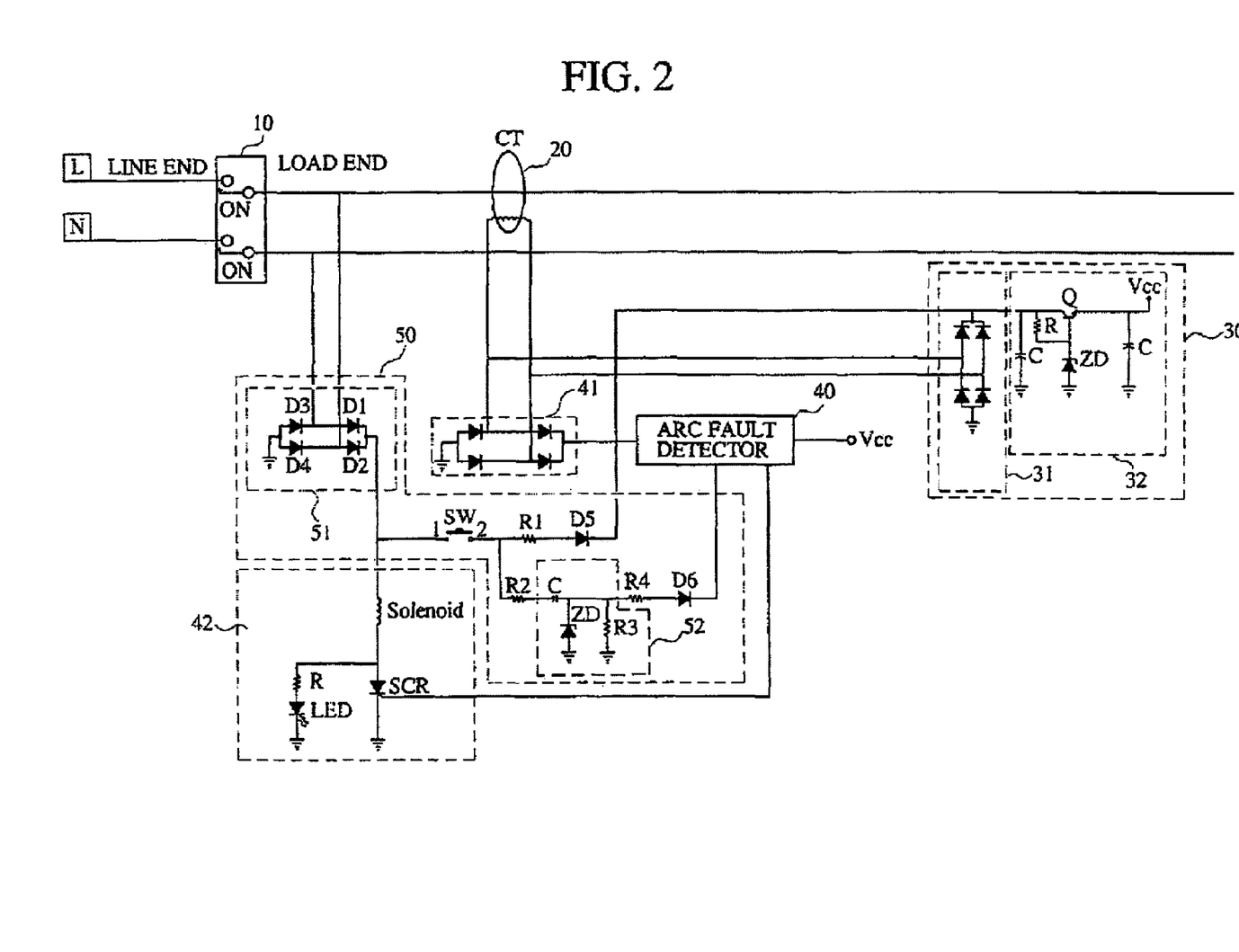
FIG. 2 is a detailed circuit diagram showing an AFCI device according to the present invention.

FIG. 1 is a block diagram showing an AFCI device according to the present invention, and FIG. 2 is a detailed circuit diagram showing an AFCI device according to the present invention.

An AFCI device, as shown in FIG. 1, comprises a power breaker 10 and a current transformer (CT) 20 which are connected to an alternating-current (AC) power line, respectively. The current transformer (CT) 20 is connected to a power circuit 30 and an arc fault detector 40, respectively. The power circuit 30 receives an AC power induced from the current transformer (CT) 20, and supplies the received power as drive power for a circuit necessary for the arc fault detector 40. The arc fault detector 40 receives the drive power from the power circuit 30, judges whether an arc fault from a signal detected in the current transformer (CT) 20 is generated. When the arc fault occurs, the arc fault detector 40 controls the power breaker 10 to shut off the power source. Also, the AFCI device of FIG. 1 comprises a false arc generator 50 which generates a false arc to check whether the circuit operation is normally performed. The AFCI device of FIG. 1 with the above constitution will be described with reference to FIG. 2.

As shown in FIG. 2, the power breaker 10 interrupts electric power by switching connection of switches which are connected in series to a phase conductor (Hot) and a neutral conductor line (Neutral; Neu) of AC lines, respectively.

The current transformer (CT) 20 around one side of which a phase conductor line through which an alternating-current (AC) power line is supplied is wound by a certain number of times. In this embodiment, although the phase conductor line (Hot) has been wound around the current transformer (CT) 20, the neutral conductor line (Neu) can be wound therearound.

The power circuit 30 includes a rectifier 31 which rectifies an AC voltage signal induced from the conductor line wound around the one side of the current transformer (CT) 20 into a direct-current (DC) signal, and a constant voltager 32 which converts the rectified result into a constant voltage signal to then be supplied as drive power for respective circuit necessary for an arc fault circuit interrupt (AFCI) device.

A rectifier 41 is disposed between the current transformer (CT) 20 and the arc fault detector 40, which rectifies the voltage according to an amount of current variation of the current transformer (CT) 20. The arc fault detector 40 is supplied with a drive power source Vcc from the power circuit 30 and the rectified signal applied from the rectifier 41, to judge whether the arc fault is generated.

Here, the rectifiers 31 and 41 employs a bridge circuit composed of four diodes, but is not limited thereto. Also, plural rectifiers 31 and 41 are connected in common to the single current transformer (CT) 20, a supply of a drive power and a detection of an electric arc fault are performed in parallel using a signal current transformer (CT) 20.

The arc fault detector 40 is connected to a display 42 for displaying whether the power source is applied to the circuit to ascertain a connection state of lines The display 42 includes a solenoid, a light-emitting diode (LED) for indicating the connection state of lines as lighting, and a silicon controlled rectifier (SCR), being connected in parallel with the LED, which makes the SCR turned on and the LED turned "OFF" when an interrupt signal of the arc fault detector 40 is applied. That is, the display is configured in such a manner that when the power source is applied, the LED is turned "ON", but when the interrupt signal of the arc fault detector 40 is applied, the LED is turned "OFF".

A false arc generator 50 includes a button-typed switching unit (SW) for testing, a rectifier 51 which is connected to an alternating line and rectifies alternating-current voltage, being designed as a bridge diode, a voltage drop resistor R2 which drops the voltage of the rectified signal, and a mono-stable multivibrator 52 which adjusts a voltage level and a pulse width of the voltage-dropped signal and generates a pulse signal which generates a false arc. The mono-stable multivibrator 52 includes a Zener diode (ZD) that determines a voltage level of the pulse signal, and a resistor R3 and a capacitor C that change a pulse width of the pulse signal based on a time constant of the resistor R3 and the capacitor C.

Also, the false arc generator 50 supplies the power to the power circuit 30 through a resistor R1 and a diode D1 so that the operation of the power circuit 30 and generation of the false arc are simultaneously made at the time when the switching unit (SW) for testing works.

The operations of the AFCI device according to the present invention having the above constitution will be in detail described with reference to FIGS. 3 to 7.

When the power source is induced via the AC line, the current transformer (CT) 20 converts a current difference flowing on the AC power line into voltage, and then outputs the voltage to the arc fault detector 40. At this time, a voltage signal which is induced from the conductor line that is wound around one side of the current transformer (CT) 20 is supplied to the power circuit 30.

The rectifier 31 of the power circuit 30 rectifies the voltage signal that is induced from the current transformer (CT) 20. Here, the rectifier 31 employs a bridge circuit composed of four diodes, but is not limited thereto, which has been obvious to a person of ordinary skill in the art. A constant voltager 32 converts the rectified voltage signal in the rectifier 31 into a constant voltage signal to then be supplied as drive power necessary for respective circuits at a load end. That is, the constant voltage signal is supplied as drive power for circuits of the AFCI device.

In the present embodiment, in order to perform a supply of a drive power and a detection of an electric arc fault in parallel using a signal current transformer (CT) 20, as shown in FIG. 2, plural rectifiers 31 and 41 are connected in common to the signal current transformer (CT) 20, but plural rectifiers 31 and 41 are not used. Instead, it is configured to detect an arc fault by a power rectification line, which is shown in FIG. 3.

Figure 3:
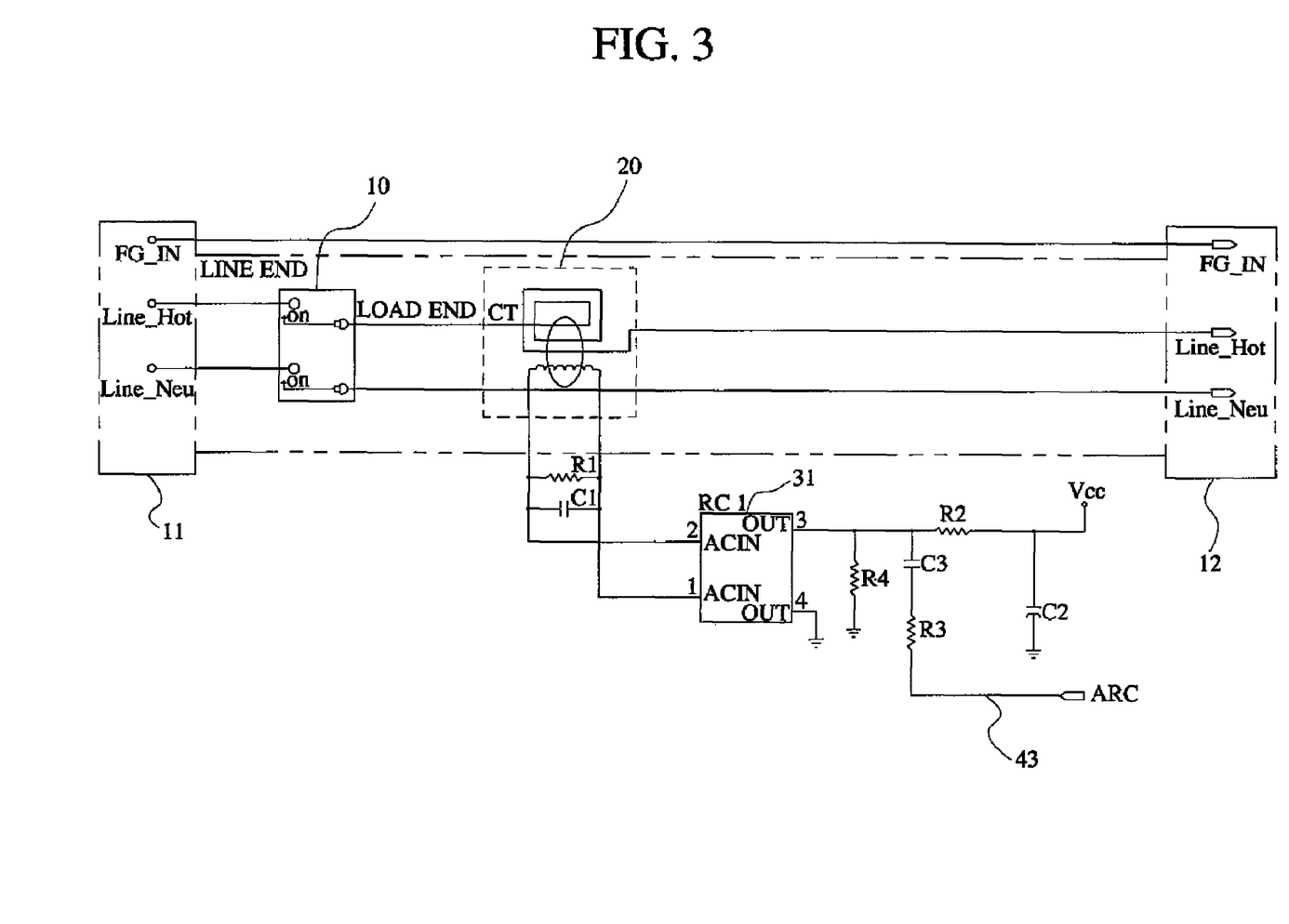
FIG. 3 is a diagram showing a power circuit of an AFCI device according to an embodiment of the present invention.

FIG. 3 is a circuit diagram showing a power circuit according to another embodiment of the present, invention. In FIG. 3, in order to perform a supply of a drive power and a detection of an electric arc fault in parallel using a signal current transformer (CT) 20, draws an electric arc fault detection line 43 from the power rectification line of the rectifier 31.

In FIG. 3, the current transformer (CT) 20 that is connected to the AC power line converts a current difference flowing on the AC power line into voltage. Here, a voltage signal which is induced from the conductor line that is wound around one side of the current transformer (CT) 20 is output to a rectifier 31. The rectifier 31 rectifies the voltage signal which has been induced from the current transformer (CT) 20 into a DC form so as to be used as a drive power at a load end. Here, the output from the rectifier 31 is used for judging whether or not an arc fault occurs through the arc fault detection line 43. This can get circuit drive power at the same time electric are fault detection using one current transformer (CT) 20 and rectifier 31.

Meanwhile, the arc fault detector 40 is supplied with drive power for circuits from the power circuit 30. The arc fault detector 40 controls the rectifier 41 to rectify the alternating-current voltage signal induced from the current transformer (CT) 20 into a direct-current (DC) signal and to detect an arc fault therefrom, as shown in FIG. 2, or the electric arc fault detection line 43 to detect the arc fault using the output of the rectifier 31, as shown in FIG. 3. When the arc fault occurs, the arc fault detector 40 generates an interrupt signal and actuates the power breaker 10 to interrupt the power source that is applied from a source unit 11 to a load end 12.

If the interruption signal of the arc fault detector 40 is input to a Silicon Controlled Rectifier (SCR) gate of the display 42, the SCR is turned on. If the SCR becomes "on", all the power sources that are induced through the solenoid flow into the ground through the SCR, and the LED that is connected in parallel with the SCR becomes turned "OFF", which means the connection of the lines to be broken.

Also, the false arc generator 50 generates the false arc to ascertain whether the operation of the AFCI device is performed.

An arc wave will be described below before specific explanation therefor, In FIG. 4, waveform "A" illustrates an actual arc current waveform, and waveform "B1" illustrates an output of a filter in an arc fault circuit interrupter (AFCI) in which the filter filters only an arc at the time of inflow of the arc current of the waveform "A".

Figure 4:
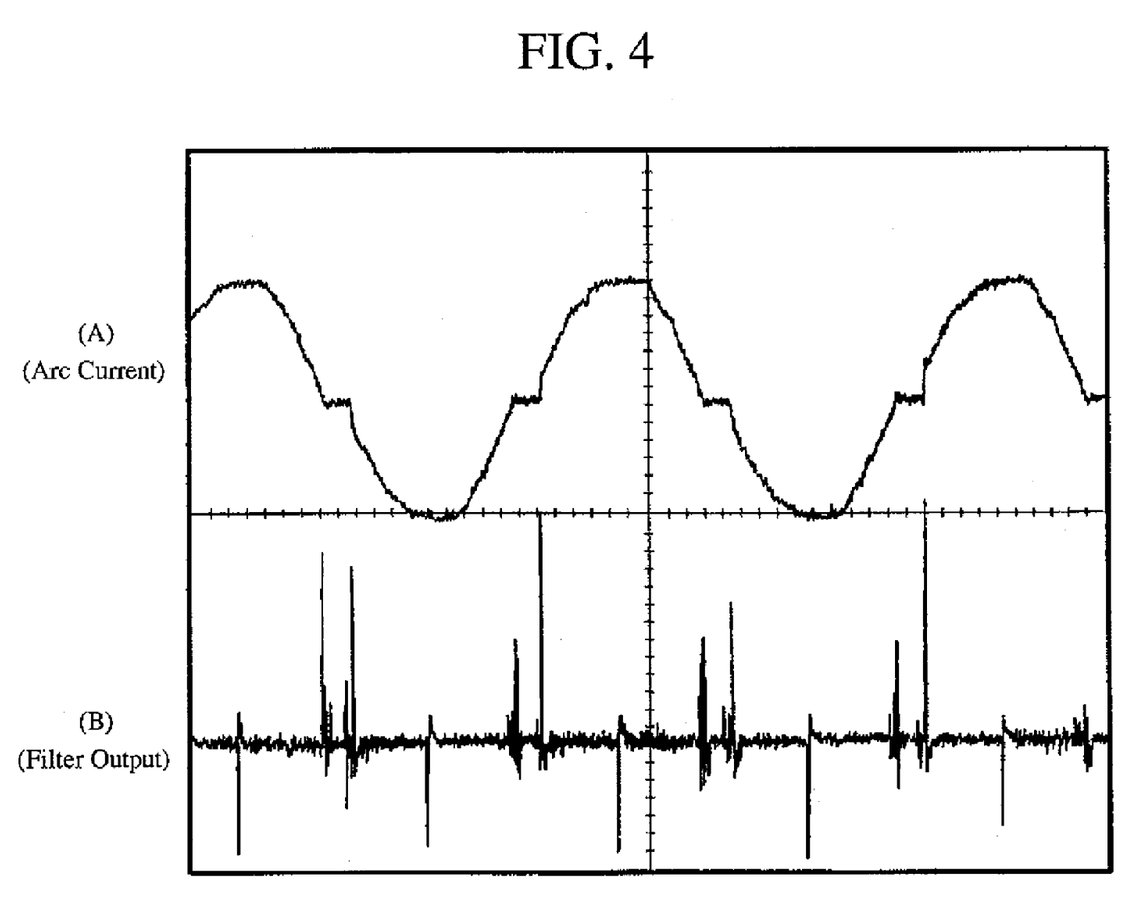
FIG. 4 illustrates waveform diagrams of an actual arc current as a waveform "A" and a filter output of an arc fault detector as a waveform "B" where an arc fault is normally generated, respectively.
Figure 5:
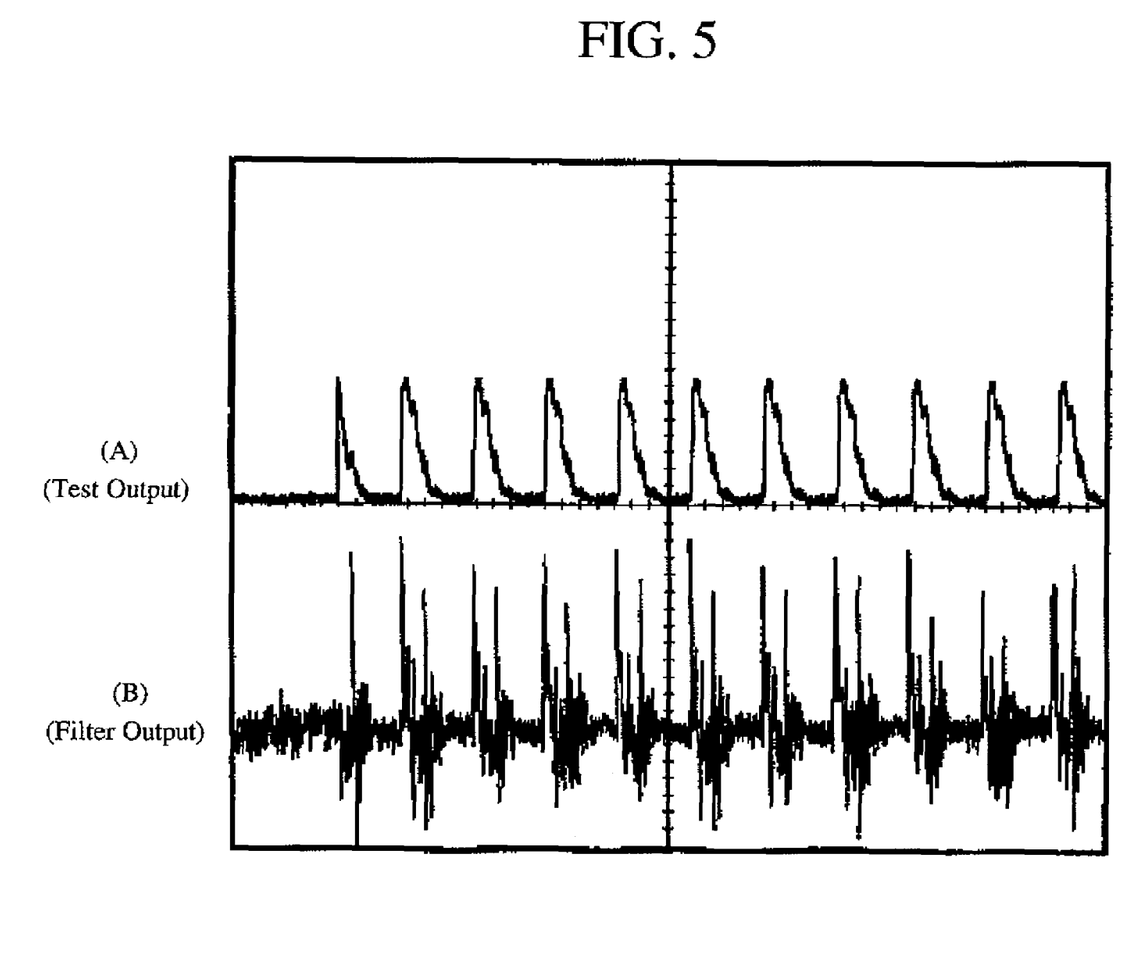
FIG. 5 illustrates waveform diagrams of a false arc signal as a waveform "A" and a filter output of an arc fault detector as a waveform "B" where a false arc fault is generated, respectively.

In order to generate an arc signal randomly as shown as the waveform "B" of FIG. 4 for testing an arc fault circuit interrupter (AFCI), a test signal is needed as shown as waveform "A" of FIG. 5 resulting from a simulation. That is, if the test signal of the waveform "A" of FIG. 5 is applied as the input of the arc fault circuit interrupter (AFCI) and is filtered by the filter, a false arc shown as waveform "B" of FIG. 5 which is similar to the actual arc of the waveform "B" of FIG. 4 is generated.

The false arc generator 50 provides an arc wave generator that generates a test signal of the waveform "A" of FIG. 5 for generating a false arc as shown as the waveform "B" of FIG. 5.

Figure 7:
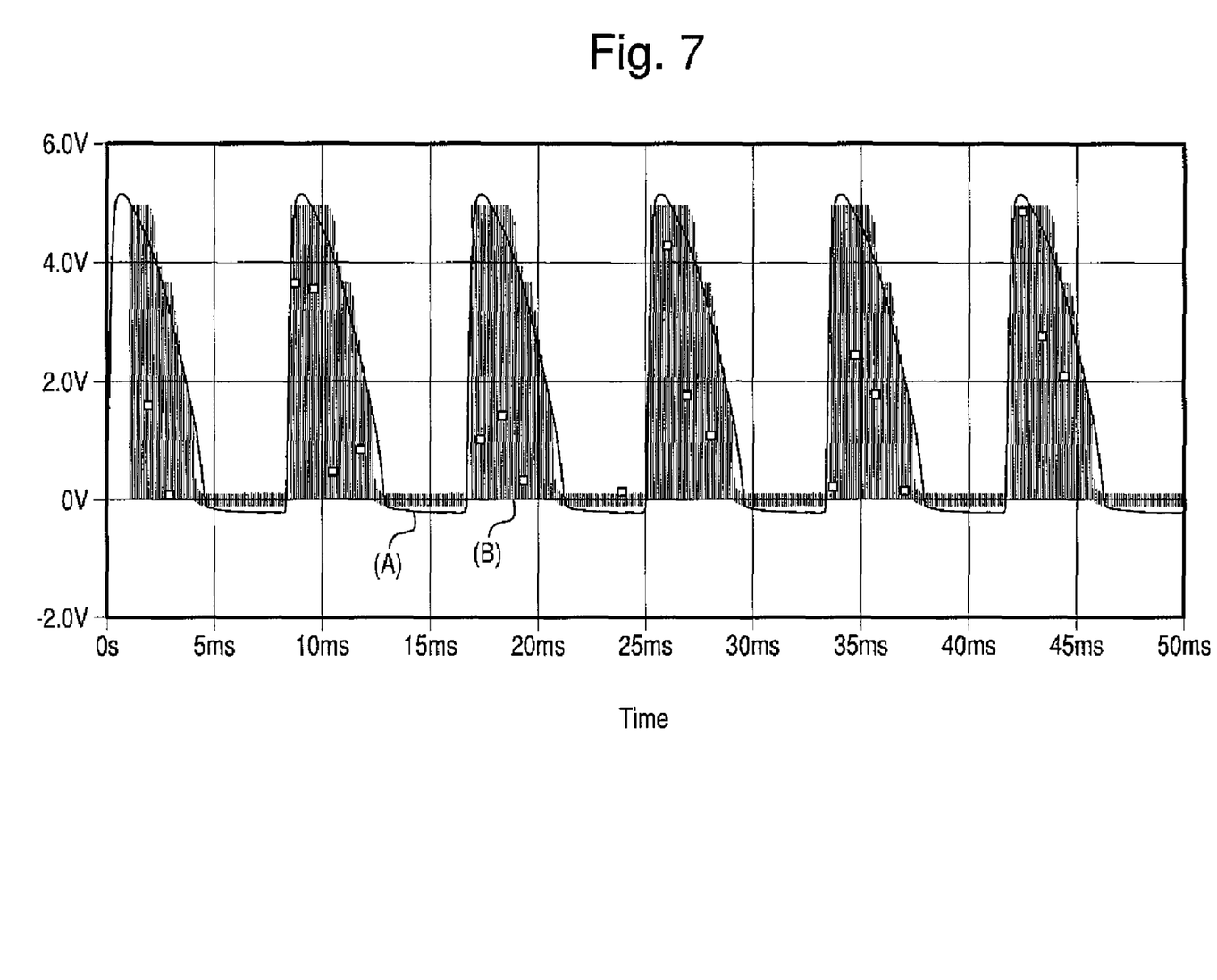
FIG. 7 is a waveform diagram of the false arc generator of FIG. 6.

For testing an arc fault circuit interrupter (AFCI), the test button of the false arc generator 50 (FIG. 2) is first operated. The rectifier 51 of the false arc generator 50 receives a commercial power source of 120V or 240V as an input and rectifies alternating-current voltage Vac of the commercial power source. Here, since the alternating-current voltage Vac of the commercial power source is a sinusoidal wave, the rectified wave in the rectifier 51 becomes a half-wave pulse which repeats with a phase interval of 180 degrees. The rectifier 51 is designed as a bridge circuit where four diodes D1, D2, D3 and D4 are connected in the form of a bridge, but is not limited hereto. The half-wave rectified signal from the rectifier 51 is applied to the power circuit 30 through the resistor R1 and the diode D1 and at the same time is voltage-dropped according to a resistance value of the drop resistor R2. The mono-stable multivibrator 52 generates a rectangular wave pulse from the voltage-dropped signal. Here, the mono-stable multivibrator 52 determines the voltage level of the rectangular wave pulse that is generated based on the Zener diode (ZD) which is connected in parallel with the drop resistor R2. The mono-stable multivibrator 52 determines a tilt, that is, a pulse width of the rectangular wave pulse, that represents the voltage drops based on the time constant of the capacitor C which is connected in series with the drop resistor R2 and a resistor R3 which is connected in parallel with the capacitor C. Thus, the output wave of the mono-stable multivibrator 52 is shown as waveform "A" of FIG. 7. The waveform "A" of FIG. 7 is the same as the waveform of the test signal shown as waveform "A" of FIG. 5 that generates an arc. The waveform "A" of FIG. 7 shows the output waveform of the mono-stable multivibrator 52 and is input to an arc detection filter end of an arc fault circuit interrupter (AFCI) to test the action of the arc fault circuit interrupter (AFCI).

Figure 6:
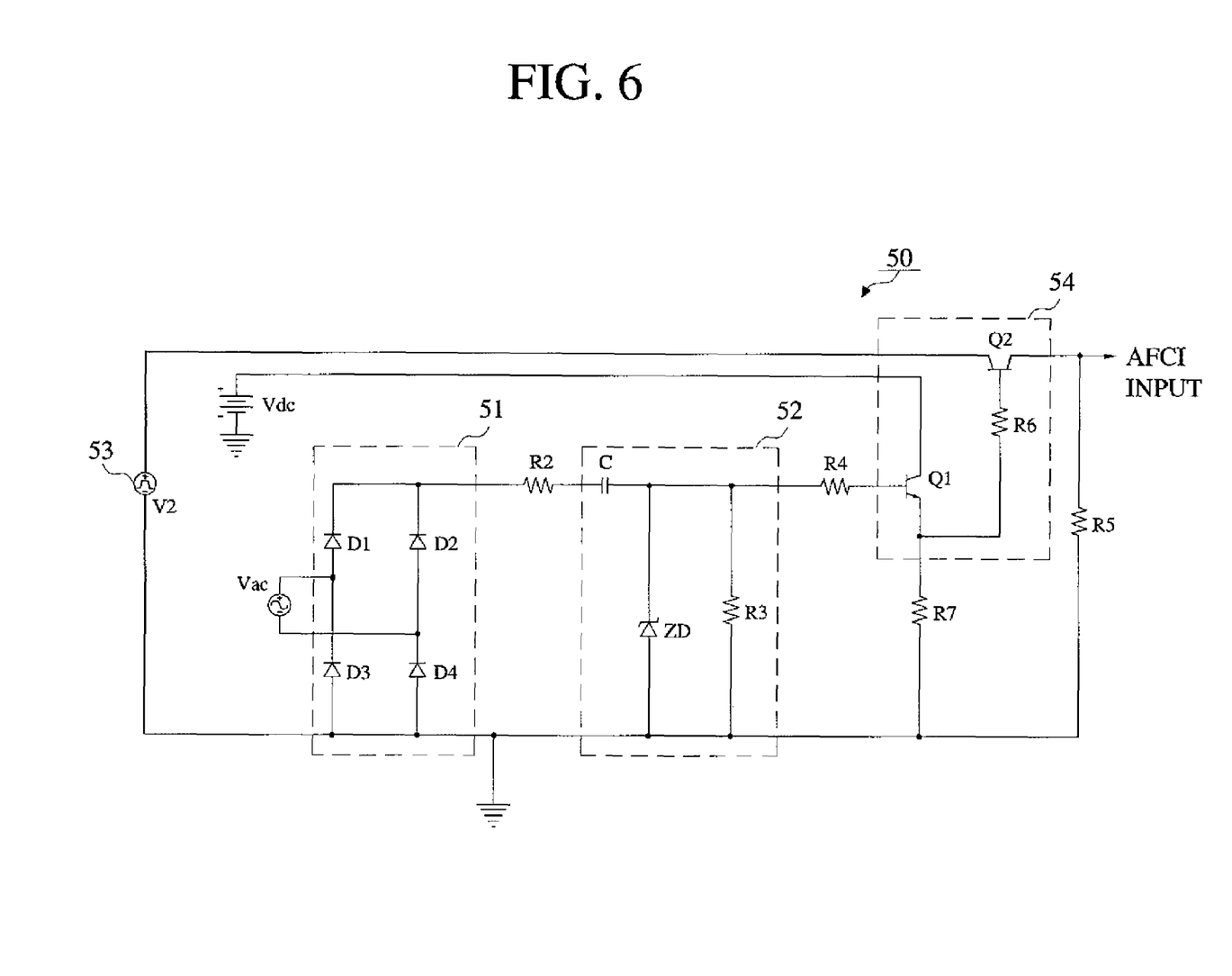
FIG. 6 is a circuit diagram of an false arc generator according to another exemplary embodiment of the present invention.

FIG. 6 is a circuit diagram illustrating an false arc generator according to another exemplary embodiment of the present invention. The false arc generator shown in FIG. 6 is configured similarly to the false arc generator shown in FIG. 2. Here, the false arc generator shown in FIG. 6, further includes a high-frequency generator 53, and a switching unit 54 which includes a first transistor Q1 which is turned "ON/OFF" according to the rectangular wave that is generated by the mono-stable multivibrator 52, and a second transistor Q2 which is operated in connection with the first transistor Q1 and performs a switching operation with respect to a high-frequency signal that is generated from the high-frequency generator 53. Here, in FIG. 6, the same reference numerals as those of FIG. 2 are assigned for the same elements as those of FIG. 2.

In FIG. 6, the rectifier 51 receives a commercial power source of 120V or 240V as an input and rectifies alternating-current voltage Vac of the commercial power source. Since the alternating-current voltage Vac of the commercial power source is a sinusoidal wave, the rectified wave in the rectifier 51 becomes a half-wave pulse which repeats with a phase interval of 180 degrees. The rectifier 51 is designed as a bridge circuit where four diodes D1, D2, D3 and D4 are connected preferably in the form of a bridge but is not limited hereto. The half-wave rectified signal from the rectifier 51 is voltage-dropped according to a resistance value of the drop resistor R2. The mono-stable multivibrator 52 generates a rectangular wave pulse from the voltage-dropped signal. Here, the mono-stable multivibrator 52 determines a voltage level of the rectangular pulse wave that is generated based on the Zener diode (ZD). The mono-stable multivibrator 52 determines a tilt, that is a pulse width of the rectangular pulse wave, that represents the voltage drops based on a time constant of a capacitor C which is connected in series with the drop resistor R2 and a resistor R3 which is connected in parallel with the capacitor C. Thus, the output wave of the mono-stable multivibrator 52 is shown as a waveform "A" of FIG. 7. The output wave of the mono-stable multivibrator 52 (the waveform "A" of FIG. 7) is applied to the base of the first transistor Q1 of the switching unit 54 through the resistor R4. In addition, the direct-current voltage Vdc of 5V is applied to the collector of the first transistor Q1. Thus, the first transistor Q1 is turned "ON/OFF" according to the output wave from the mono-stable multivibrator 52 (that is, the output waveform "A" of FIG. 7). Accordingly, the direct-current voltage Vdc of 5V which is applied to the collector of the first transistor Q1 is output through the emitter of the first transistor Q1. Meanwhile, the high-frequency generator 53 generates the pulse having a voltage value of 5V and high-frequency value of 1.about.9 MHz.

The high-frequency signal that is generated from the high-frequency generator 53 is applied to the collector of the second transistor Q2 in the switching unit 54. The base of the second transistor Q2 is connected with the emitter of the first transistor Q1 through the resistor R6, and thus the second transistor Q2 is turned "ON/OFF" in linkage with the "ON/OFF" actions of the first transistor Q1. The second transistor Q2 is turned on as the first transistor Q1 has been turned on. Thus, the high-frequency signal generated by the high-frequency generator 53 which is connected with the collector of the second transistor Q2 is output through the emitter of the second transistor Q2. Here, the output waveform which is output through the second transistor Q2 of the switching unit 54 is the same as the waveform "B" of FIG. 7. The output wave (the waveform "B" of FIG. 7) of the switching unit 54 is input to an arc detection filter end of an arc fault circuit interrupter (AFCI) to test the action of the arc fault circuit interrupter (AFCI).

In the above-described embodiments, the arc pulses generating the false arc are substantially the same as the waveform "A" of FIG. 4, and thus the arc shown in the waveform "B" of FIG. 4 is generated.

As stated above, the AFCI device according to the present invention provides an effect that can prevent malfunction of the power circuit. For this purpose, instead of an AC line, a current transformer (CT) is used to obtain a drive power necessary for an AFCI circuit-breaker. Here, only when an electric device connected to a load end operates, the current transformer (CT) operates to obtain an electric power source. Accordingly, mis-operations due to several arcing signals such as lightening surges that flow in the AC line can be prevented at the state where a device power switch is turned off. Also, the AFCI device according to the present invention provides an effect that can generate an arc pulse that generates a false arc which closely approximates an actual arc for testing. The arc wave generator may have a simple circuit configuration and may be simply manufactured for adjusting a pulse width and a pulse level to easily make a test system.

As described above, the present invention has been described with respect to particularly preferred embodiments. However, the present invention is not limited to the above embodiments, and it is possible for one who has an ordinary skill in the art to make various modifications and variations, without departing off the spirit of the present invention. Thus, the protective scope of the present invention is not defined within the detailed description thereof but is defined by the claims to be described later and the technical spirit of the present invention.

What is claimed is:

1. An AFCI device which detects an electric arc fault from an alternating-current (AC) power, the AFCI device comprising:
   a current transformer wound around one side of which a conductor line through which the alternating-current power is supplied by a certain number of times;
   a power circuit which rectifies an alternating-current voltage signal induced from the conductor that is wound around one side of said current transformer, and converts the rectified result into a constant voltage signal to then be supplied as drive power necessary for an arc fault detector;
   an arc fault detector supplied with the drive power from said power circuit, which detects an arc fault from a voltage signal according to an amount of current variation of said current transformer;
   a power breaker which shuts off the power source when an interrupt signal is applied from said arc fault detector;
   a display which displays the supply of the power source to ascertain whether lines are connected; and
   a false arc generator which produces a pulse signal of a waveform that generates a false arc, supplies the generated pulse signal to said arc fault detector, and tests whether a circuit operation is normally operated,
   wherein said false arc generator comprises:
      a first rectifier which receives a commercial power source as an input source and rectifies alternating-current voltage of the commercial power source to generate a rectified signal;
      a drop resistor which drops the voltage of the rectified signal to generate a voltage-dropped signal;
      a mono-stable multivibrator which adjusts a voltage level and a pulse width of the voltage-dropped signal and generates a pulse signal that is used to provide a false arc for testing the arc fault circuit interrupter;
      a high-frequency generator; and
      a switching unit which performs a switching operation with respect to the high-frequency signal that is generated from said high-frequency generator according to the output waveform of said mono-stable multivibrator, to thus generate a pulse signal that is used to generate a false arc pulse for testing the arc fault circuit interrupter to then be input to the arc fault circuit interrupter,
   wherein the switching unit comprises:
      a first transistor which is turned "ON/OFF" according to the output waveform of said mono-stable multivibrator that is applied to a base of the first transistor, and outputs the direct-current voltage that is applied to the collector of the first transistor through an emitter thereof; and
      a second transistor, whose base is connected thereto if connected with the emitter of the first transistor, and which is operated in linkage with the "ON/OFF" operations of the first transistor, in which the second transistor is turned on as the first transistor is turned on, to thus output the high-frequency signal which has been generated from the high-frequency generator and applied to the collector of the second transistor, through the emitter of the second transistor.

2. The AFCI device according to claim 1, wherein any one of a phase conductor line and a neutral conductor line in alternating-current lines is wound around said current transformer.

3. The AFCI device according to claim 1, wherein said power circuit comprises;
   a second rectifier which rectifies an AC voltage signal induced from the conductor line wound around the one side of the current transformer into a direct-current (DC) signal; and
   a constant voltager which converts the rectified result of said second rectifier into a constant voltage signal to then be supplied as drive power for said arc fault detector.

4. The AFCI device according to claim 3, wherein a third rectifier which is disposed between said current transformer and said arc fault detector rectifies the voltage according to an amount of voltage variation of the current transformer.

5. The AFCI device according to claim 4, wherein said arc fault detector judges whether an arc fault is generated from the rectified signal in said third rectifier.

6. The AFCI device according to claim 3, wherein the arc fault detector draws an arc fault detection line from a power rectification line of said second rectifier and judges whether an arc fault occurs according to the rectified signal of the second rectifier.

7. The AFCI device according to claim 1, wherein said display comprises:
   a solenoid;
   a light-emitting diode (LED) for indicating a connection state of lines; and
   a silicon controlled rectifier which is connected in parallel with the LED, and makes the LED turned "OFF" in condition of "ON" if an interrupt signal is applied from said arc fault detector.

8. The AFCI device according to claim 1, wherein the false arc generator 50 further comprises:
   a first resistor and a diode being connected in series to form lines for supplying the rectified signal from said first rectifier to said power circuit if the switching is turned "ON".

9. The AFCI device according to claim 1, wherein the first rectifier comprises diodes which are connected in the form of a bridge, and rectifies the alternating-current voltage of the commercial power source in a half-wave form.

10. The AFCI device according to claim 1, wherein the mono-stable multivibrator comprises a Zener diode which determines a voltage level of the voltage-dropped signal with the drop resistor, and a resistor and a capacitor which determine a tilt representing a voltage drop by a time constant to thus changing a pulse width.

* * * * *